United States Patent
Inariba

[11] 3,904,902
[45] Sept. 9, 1975

[54] SYNCHRONOUS MOTOR

[76] Inventor: Tokuzo Inariba, No. 501, Nozawa Co-op., No. 21, Nozawa, 4-chome, Setagaya-ku, Tokyo-to, Japan

[22] Filed: Feb. 22, 1974

[21] Appl. No.: 444,874

[30] Foreign Application Priority Data
Feb. 26, 1973 Japan............................ 48-22214

[52] U.S. Cl. ................. 310/162; 310/154; 310/266
[51] Int. Cl. ............................................ H02k 21/00
[58] Field of Search ....... 310/40, 40 MM, 162, 163, 310/164, 49, 154, 172, 266, 67

[56] References Cited
UNITED STATES PATENTS

| | | | |
|---|---|---|---|
| 3,348,083 | 10/1967 | Inariba | 310/154 |
| 3,519,859 | 7/1970 | Morreale | 310/266 |
| 3,555,325 | 1/1971 | Inariba | 310/162 |
| 3,571,638 | 3/1971 | Inariba | 310/164 |
| 3,602,749 | 8/1971 | Ester | 310/154 |
| 3,633,055 | 1/1972 | Maier | 310/162 |
| 3,684,907 | 8/1972 | Hinachi | 310/164 |

*Primary Examiner*—R. Skudy
*Attorney, Agent, or Firm*—Steinberg & Blake

[57] ABSTRACT

A synchronous motor which has a stator which includes a pair of permanent magnets of circular configuration surrounding a common axis and situated adjacent each other on opposite sides of a plane normal to the latter axis. Each of the permanent magnets has a series of N and S poles and the poles of one of the permanent magnets has a predetermined out-of-phase relationship with respect to the poles of the other of the magnets. These circular permanent magnets are coaxially surrounded by a pair of coils which are also situated adjacent each other on opposite sides of the latter plane, with a plate of magnetic material being situated in the plane between these coils to separate them from each other. The coils are respectively supplied with alternating currents which have with respect to each other the same out-of-phase relationship as the poles of the pair of permanent magnets, and the plate between the coils has an inner edge which is of a diameter substantially larger than that of the permanent magnets. A rotor is supported for free rotary movement around the above axis and includes a cylindrical wall which extends between the pair of permanent magnets, on the one hand, and the pair of coils and the plate therebetween, on the other hand. This cylindrical wall coaxially surrounds the above axis and is formed with a plurality of elongated axially extending openings circumferentially distributed uniformly around the above axis with the cylindrical wall of the rotor having between these openings elongated portions which extend parallel to the above axis. The number of poles of each of the permanent magnets is an even multiple of the number of elongated portions of the cylindrical wall of the rotor.

8 Claims, 10 Drawing Figures

SYNCHRONOUS MOTOR

BACKGROUND OF THE INVENTION

The present invention relates to electrical motors.

In particular, the invention relates to self-starting synchronous motors and especially to small, light-weight micromotors.

Many types of induction synchronous motors are known. While motors of this type have a self-starting capability, they are free to start rotation in either direction. It is thus essential with such motors to provide a control to assure rotation in the desired direction. Usually a mechanical structure is required for this purpose. Such mechanical structure increases the possibility of faulty operation of the motor due to wear and other problems encountered with such mechanical structure. In addition such mechanical structure often results in failure of starting of the motor.

In addition, with previously known induction motors it is essential to use a rotor which has a relatively large moment of inertia as well as a relatively large weight in order to achieve smooth rotation. This relatively large moment of inertia and weight of conventional motors of the above type reduces considerably the self-starting capability of the conventional motors. Thus, it is known that a micromotor having a rotor of relatively large weight and increased moment of inertia is largely influenced by the starting power and operation power so as to achieve only a low operation efficiency while generating undesirable heat.

Furthermore, with conventional motors of the above type N and S poles are developed between the stator and rotor. As a result permanent magnets cannot be used effectively.

SUMMARY OF THE INVENTION

It is accordingly a primary object of the present invention to provide a motor of the above general type which will avoid the above drawbacks.

Thus, it is an object of the present invention to provide a light-weight synchronous micromotor which has a self-starting capability and which will reliably rotate when energized in a predetermined direction without requiring the use of any mechanical structure to assure rotation in the desired direction.

Also it is an object of the present invention to provide a motor of the above type which has a rotor of relatively light weight without any particularly large moment of inertia while at the same time achieving a smooth rotation.

Furthermore it is an object of the present invention to provide a motor of the above type which can provide the desired rotary movement while utilizing relatively small magnetic forces.

In addition it is an object of the present invention to provide a motor of the above general type which will have a relatively high efficiency without generating undesirable heat.

Thus, it is an object of the present invention to provide a relatively simple rugged micromotor capable of developing a torque with a very high efficiency.

Also, it is an object of the present invention to provide a micromotor of the above general type which can make a very effective use of permanent magnets.

According to the invention a self-starting synchronous motor is provided with a stator which includes a pair of circular permanent magnet means which respectively have equal diameters and which coaxially surround a predetermined axis, each of these permanent magnet means having a series of N and S poles circumferentially distributed uniformly around the above axis with the poles of one of the permanent magnet means having a predetermined angular offset relationship with respect to the poles of the other of the permanent magnet means so as to achieve in this way a predetermined out-of-phase relationship between the poles of the pair of permanent magnet means. The pair of permanent magnet means are respectively surrounded by a pair of coil means which are situated adjacent each other on opposite sides of a plane normal to the above axis with the pair of permanent magnet means also being situated adjacent each other on opposite sides of the latter plane, and the pair of coil means have a diameter larger than that of the permanent magnet means and respectively receive alternating currents which have with respect to each other the same out-of-phase relationship as the poles of the pair of permanent magnet means. The pair of coil means are separated from each other by a magnetic plate which is situated in the above plane. A rotor is supported for rotation around the above axis and includes a cylindrical wall coaxially surrounding this axis and extending between the pair of permanent magnet means, on the one hand, and a pair of coil means with the plate therebetween on the other hand. This cylindrical wall of the rotor is formed with a plurality of axially extending cutouts circumferentially distributed around the above axis and separated from each other by elongated portions of the cylindrical wall which also are uniformly distributed circumferentially around the above axis. The rotor has at one end of its cylindrical wall a flat end wall while the stator includes a casing part of which is formed by an end wall parallel to and spaced only slightly from the flat end wall of the rotor to define a narrow gap therewith. At its end opposite the above flat end wall the rotor may have an outwardly directed flange while the casing of the stator has a second end wall extending parallel to and spaced only slightly from the latter flange to define a narrow gap therewith.

Thus, with the motor of the invention there is a two-stage coil and a pair of permanent magnets which serve as a stator, while a cylindrical rotor of circular cross section is provided with elongated axially extending portions the configuration of which makes the magnetic flux of an AC magnetic field developed by the coils effectively intersect the magnetic flux existing at the cylindrical circumferential surfaces of the permanent magnets, while at the same time magnetic losses are minimized by the ends of the rotor at the narrow gaps formed in the AC magnetic circuit.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
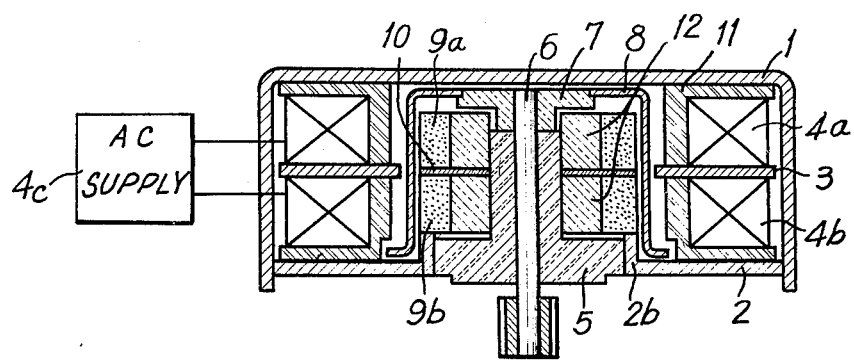
FIG. 1 is a sectional elevation illustrating a motor of the invention in a schematic manner, the plane of FIG. 1 including the central axis of the motor.
Figure 2:
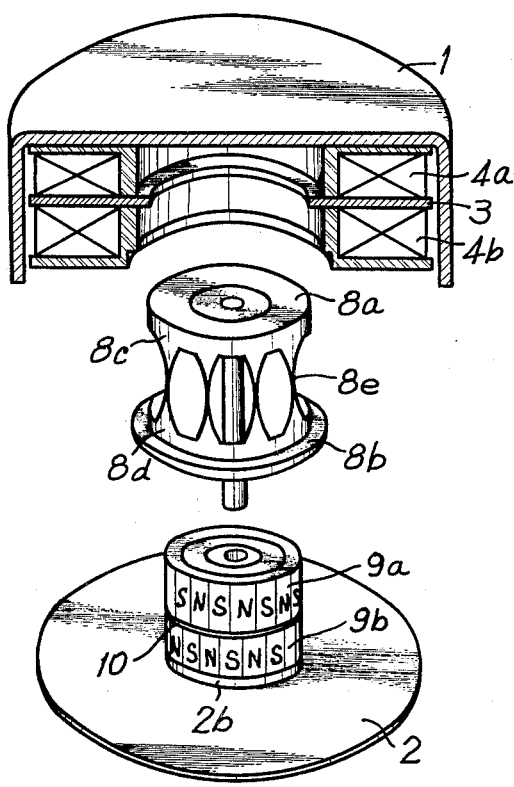
FIG. 2 is an exploded perspective partly sectional illustration of components of the motor of FIG. 1.
Figure 4A:
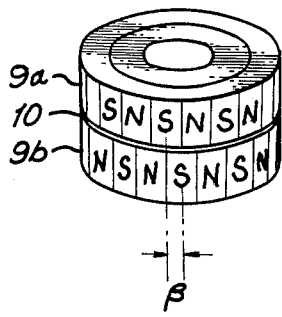
FIG. 4A is a schematic perspective illustration of a pair of permanent magnet means which form part of the stator.
Figure 4B:
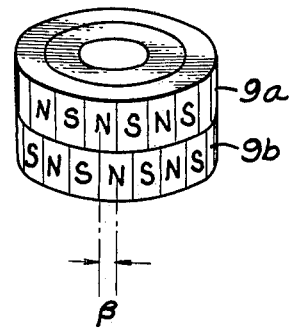
FIG. 4B is a perspective illustration of the pair of permanent magnet means of FIG. 4A as they appear at the side thereof which is not visible in FIG. 4A.

Referring to FIGS. 1 and 2, the embodiment of a motor of the invention which is illustrated therein includes a motor casing means 1, 2. The parts 1, 2 of the motor casing means are made of a soft magnetic material and serve both as a casing and a yoke. The part 1 has a cylindrical outer side wall and a flat end wall shown at the upper part of FIGS. 1 and 2, while the part 2 of the casing means is in the form of a circular plate fixed at its outer peripheral edge to the inner surface of the cylindrical side wall of the casing part 1. A circular magnetic plate 3 is situated substantially midway between the closure plate 2 and the flat end wall of the casing part 1, being parallel to the plate 2 and the flat end wall of the casing part 1, and this magnetic plate 3 may be considered as forming an electrode. The plate 3 is of a circular configuration and is situated between a pair of circular coil means 4a and 4b which together constitute a double-stage coil, the circular coil means 4a and 4b as well as the magnetic plate situated between and separating the pair of coil means all being arranged coaxially around a common axis which coincides with the axis of the shaft 6. As is shown schematically at the left of FIG. 1, the pair of coil means 4a and 4b are electrically connected with a unit 4c forming an AC supply capable of being connected with any suitable source of alternating current and acting in a known way to provide the pair of coils 4a and 4b with alternating currents of equal frequency but having a predetermined out-of-phase relationship with respect to each other. The shaft 6 forms part of a support means operatively connected with a rotor 8 to support the latter for free rotary movement. For this purpose the shaft 6 is supported for free rotary movement in a bearing 5 which is made of a non-magnetic material and which is centrally fixed to the base plate 2. This bearing 5 which supports the shaft 6 for free rotary movement also serves to support through the non-magnetic rings 12 a pair of circular permanent magnet means 9a and 9b made of barium ferrite. The pair of permanent magnet means 9a and 9b each include a series of N and S poles circumferentially distributed about the axis of the shaft 6. Thus, as is most clearly shown in FIGS. 4A and 4B the series of N and S poles of each of the permanent magnet means 9a and 9b alternate with each other while the poles of one of the permanent magnet means are angularly offset with respect to the poles of the other of the permanent magnet means by the angular distance $\beta$, as indicated in FIGS. 4A and 4B. This angular offset provides a predetermined out-of-phase relationship between the poles of the pair of permanent magnet means 9a and 9b, and as will be apparent from the description below this out-of-phase relationship corresponds to the out-of-phase relationship between the alternating currents supplied to the pair of coil means 4a and 4b. As is apparent from FIGS. 4A and 4B each pole of each permanent magnet is situated along a line which is parallel to the axis of the shaft 6 and which is situated between a pair of successive poles of the other permanent magnet. In this way a predetermined phase angle $\beta$ is provided between the poles of the pair of permanent magnet means 9a and 9b. In the particular example shown in FIGS. 4A and 4B each of the permanent magnets 9a and 9b is provided with 8N poles which respectively alternate with 8S poles, all of these poles being uniformly distributed circumferentially around the common axis of the pair of permanent magnets.

The pair of permanent magnet means 9a and 9b are situated adjacent each other respectively on opposite sides of a plane normal to the common axis around which the pair of permanent magnet means extend, and this plane is occupied by a plate 10 made of a soft magnetic material, this plate 10 separating the pair of permanent magnet means from each other and preventing the pair of permanent magnet means from having an undesirable reaction with respect to the rotor 8. Moreover, the plate 10 is situated in the same plane as the plate 3 with the pair of coil means 4a and 4b together with the supporting structure 11 on which the coils are wound circumferentially surrounding the pair of permanent magnets 9a and 9b coaxially while being spaced therefrom to define in this way between the inner surfaces of the coil structures 11 and the outer surfaces of the pair of permanent magnet means 9a and 9b an axially extending cylindrical gap of substantially uniform width. It will be noted that the inner circumferential edge of the plate 3 which extends along a circle whose center is in the axis of the shaft 6 has a diameter only slightly smaller than that of the inner surfaces of the coil elements 11. Thus, the series of magnetic poles of the pair of permanent magnet means 9a and 9b are arranged so that they are directed toward the inner circumferential surfaces of the coil parts 11 and together with the plate 3 the required magnetic fields are developed as set forth below.

Figure 3A:
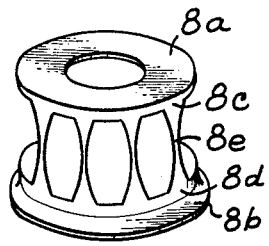
FIG. 3A is a perspective illustration of a rotor utilized in the motor of FIGS. 1 and 2.
Figure 3B:
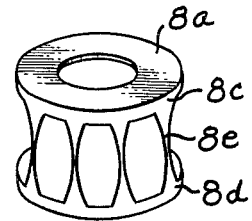
FIG. 3B shows a rotor having a construction slightly different from that of FIG. 3A.

As is apparent particularly from FIGS. 3A and 3B, the rotor 8 is of a cylindrical configuration and is circular in cross section having a cylindrical wall which coaxially surrounds the axis of the shaft 6, this cylindrical wall of the rotor 8 extending into the elongated annular cylindrical gap of uniform thickness which is defined between the pair of permanent magnet means 9a and 9b, on the one hand, and the pair of coil means 4a and 4b and the plate 3, on the other hand, all of these elements, with the exception of the rotor 8, forming part of the stator and being stationary. The rotor 8 is formed in its cylindrical wall with a plurality of uniformly distributed elongated cutouts which except for their straight ends have a substantially elliptical configuration and which are uniformly distributed about the common axis of all of the circular components. These elongated axially extending cutouts are separated from each other by elongated rotor portions 8e which are also uniformly distributed about the rotor axis and which are each of a substantially hourglass configuration. Thus each of the elongated portions 8e of the rotor extends parallel to the axis of the shaft 6 and has in the plane occupied by the plates 3 and 10 a minimum width. At each side of this plane each elongated portion 8e becomes gradually wider in a direction away from the plane, as is apparent from FIGS. 3A and 3B. Thus the widest parts of the elongated portions 8e merge into the annular opposed end portions 8c and 8d of the rotor.

The upper end of the shaft 6, as viewed in FIG. 1, is fixed to and surrounded by a circular nonmagnetic boss 7 made of a light alloy or a synthetic resin and extending into and fixed to a central opening which is formed in the flat end wall 8a of the rotor 8. This flat end wall 8a of the rotor is parallel to and spaced only slightly from the transverse flat wall portion of the casing part 1 so as to define a narrow gap therewith. In the embodiment of FIG. 3A the rotor has opposite the flat end wall 8a an outwardly directed flat flange 8b which is situated closely adjacent to but spaced from the plate 2 of the casing means so as to define with the latter a narrow gap. This flange 8b is omitted from the embodiment of the rotor which is illustrated in FIG. 3B. As a result of the narrow gaps defined between the end portions 8a and 8b of the rotor and the transverse wall portions of the casing 1, 2, an AC magnetic circuit is formed with these small gaps being defined between relatively large areas provided by the flange 8b and the end wall 8a which extend parallel to the plate 2 and the transverse wall of the casing part 1.

Figure 6:
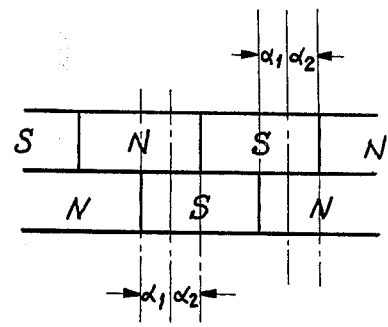
FIG. 6 is a schematic fragmentary illustration of the relationship between the poles of the pair of permanent magnet means with FIG. 6 illustrating the magnetic condition in the rest position of the rotor.
Figure 7:
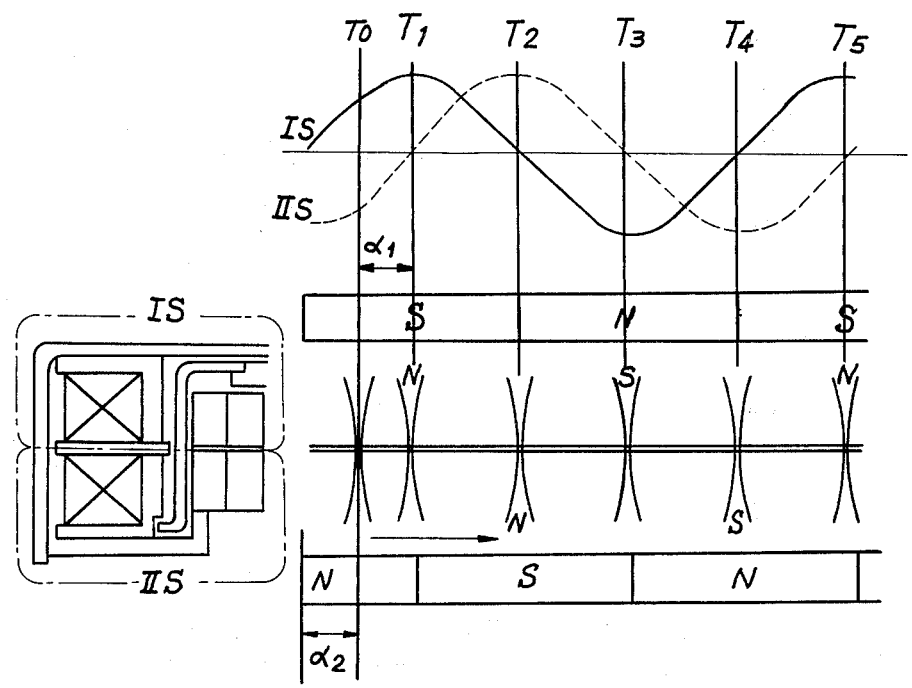
FIG. 7 is a diagrammatic representation of the operation of the motor of the invention.

The manner in which the synchronous motor of the invention develops the required torque is diagrammatically illustrated in FIG. 7. As is shown at the lower left portion of FIG. 7, the upper section IS includes the upper coil means 4a and the upper permanent magnet means 9a together with the upper half of the rotor while the second section IIS includes the lower coil 4b, the lower permanent magnet means 9b and the lower half of the rotor. In the illustrated example each of the permanent magnet means 9a and 9b has 16 magnetic poles, namely 8N poles respectively alternating with 8S poles, while the rotor has 8 axially extending elongated portions 8e. One of these axially extending portions 8e may be considered as occupying the position $T_0$ indicated in FIG. 7 when the motor is not energized. Thus, at this time the elongated portions of the rotor are positively located at equal distances from the center of a pole of one of the permanent magnet means and the center of the corresponding opposite pole of the other of the permanent magnet means. Thus, as is shown in FIG. 6, when the motor is at rest an elongated portion 8e of the rotor is situated at the location of the dot-dash line shown at the left portion of FIG. 6 at the equal angular distances $\alpha_1$ and $\alpha_2$ from the center of the left upper N pole and the lower S pole of FIG. 6. It will be noted that the S poles of the upper permanent magnet means of FIG. 6 are situated so as to have the same angular relationship with respect to the corresponding N poles of the lower permanent magnet means of FIG. 6. Of course the angular distances $\alpha_1$ equal the angular distances $\alpha_2$.

Considering now the time $T_1$ shown in FIG. 7, the time interval from energizing to the starting time $T_1$ is on the order of $0 - \frac{1}{2} \infty$. This is the time required for the rotor to move back and forth until it reaches an electrically and magnetically optimum position. At the time when the starting conditions are satisfied, the IS part of the rotor is excited so as to have an N-polarity while the IIS part of the rotor is non-excited. As is shown in FIG. 7, the current flowing through the upper coil means 4a is indicated by the solid curve IS while the current flowing through the lower coil means 4b as indicated by the dotted curve IIS, and at the instant $T_1$ the latter current is zero while the current IS has a maximum value providing the N polarity for the IS part of the rotor. As a result of this polarity created in each of the elongated portions 8e of the rotor, the IS part of the rotor necessarily moves to a location where the elongated portions of the rotor are in line with the S poles of the upper permanent magnet means 9a.

However, at the time $T_2$ the current flowing through the upper coil means is zero while the current flowing through the lower coil means has a maximum value, thus eliminating the excitation of the IS part of the rotor and providing the N-polarity at the IIS part of the rotor. As a result, the elongated portions 8e advance into line with the S poles of the lower permanent magnet means 9b.

At the time $T_3$ the IS part of the rotor is provided with the S polarity illustrated in FIG. 7 while the rotor part IIS loses its polarity, and thus each elongated rotor portions 8e moves into line with the next N pole of the upper permanent magnet means 9a.

At the time $T_4$, the current flowing through the upper coil is zero while the current flowing through the lower coil has its maximum value of opposite polarity so that the IS part of the rotor now becomes non-excited and the IIS part of the rotor receives the S polarity, causing the rotor to turn so as to locate the elongated portions 8e in alignment with the N poles of the lower permanent magnet means 9b.

Then, at the time $T_5$ the same conditions obtain as were provided at the time $T_1$. The successive elongated portions 8e of the rotor are spaced from each other by the same distance as the interval between the times $T_1$ and $T_5$, so that at these times a pair of successive elongated rotor portions are respectively in line with the upper S poles shown in FIG. 7, and in this way the rotor turns in response to the excitation as described above. Thus as a result of the above sequence of operations the motor rotates continuously. As is well known, in order to reverse the direction of rotation of the motor the phase of the coils 4a and 4b can be interchanged.

Figure 5A:
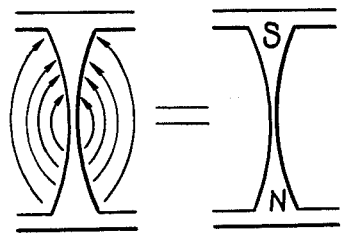
FIG. 5A is a schematic illustration of the manner in which the motor of the invention operates during one part of a current cycle.
Figure 5B:
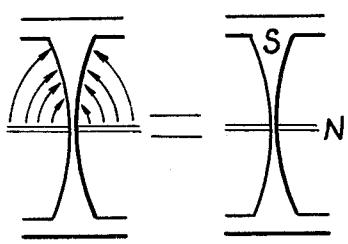
FIG. 5B is a schematic illustration of how the motor of the invention operates during another part of a current cycle.

As may be seen from FIG. 7, between the instants $T_1$ and $T_2$ the pair of currents cross each other, as is also the case between the instants $T_3$ and $T_4$. FIG. 5A shows the magnetic flux distribution at these instants when the rotor portions IS and IIS are excited in the same direction upon intersection and crossing of the pair of out-of-phase currents. The flux distribution at the instant $T_3$ of FIG. 7 is illustrated in FIG. 5B.

Thus, in accordance with the invention the rotor develops a torque as a result of the action of the magnetism as described above with respect to FIGS. 6 and 7. Previously known induction motors require a rotor which has a considerably large moment of inertia and weight in order to achieve a smooth rotation. However with the micromotor of the present invention the rotor has a moment of inertia and weight which can be minimized so as to be capable of rotation in response to relatively small magnetic forces present in the motor. With the prior art motors since the rotors must have a moment of inertia of a given magnitude, the weight cannot be reduced to the desired extent. Particularly in a micromotor the moment of inertia and weight of the rotor reduce to a remarkable extent the self-starting capability. Thus it is known that with a micromotor which has a rotor of relatively large weight and moment of inertia the starting power and operation power are influenced to an undesirable degree by these factors so that it is only possible to achieve a low efficiency while generating undesirable heat.

With the present invention the cylindrical rotor of circular cross section has the annular end portions cooperating with the transverse stator casing wall portions across a small gap so as to maximize the efficiency by establishing an AC magnetic circuit. Since the circular cylindrical rotor and stator yoke have a minimum magnetic loss, a strong magnetic flux can be developed between the stator magnets and the elongated portions of the rotor, thereby developing a torque with a high degree of efficiency.

With conventional motors the N and S poles are developed between the stator portion and the rotor, and therefore it is not possible to make effective use of a permanent magnet. However with the present invention the N and S poles are easily developed at the circumferential surface of the rotor or at the narrow central parts of the elongated rotor portions, thus making it possible to have the magnetic flux produced by these poles intersect the magnetic flux produced by the stator magnets. In this way the motor of the invention has an extremely large magnetic effect which cannot be achieved by conventional motors.

Moreover it will be seen that in contrast with conventional motors the motor of the present invention does not require any mechanical means to regulate the direction of rotation. Because the coil is in the form of a two-stage coil separated by the plate 3 which acts as a third electrode, it is possible to supply the coil stages with the AC power having the phase difference referred to above. The plate 3 is preferably made of a soft magnetic material and has outer and inner diameters almost equal to those of the coils 4a and 4b. This plate 3 together with the coils and the coil supporting structure of bobbin elements 11 are integrally secured together. The cylindrical rotor of circular section is arranged within the coils in such a way that the circumferential surface of the rotor is directed toward the inner surfaces of the coils with only a small gap therebetween. The ends of the rotor define with the adjacent parts of the casing the small gaps which establish the AC magnetic circuit.

Although in the above example the number of poles of each of the permanent magnet means is twice the number of elongated portions 8c of the rotor, it is possible to provide any arrangement according to which the number of poles of each of the permanent magnet means is an even multiple of the number of elongated portions of the rotor. Of course the out-of-phase relationship between the poles of the pair of permanent magnet means corresponds to the out-of-phase relationship between the currents flowing through the pair of coil means 4a and 4b. As was pointed out above, in the position of rest each elongated portion of the rotor is situated midway between one of the poles of one of the permanent magnet means and the next-following opposite pole of the other permanent magnet means. Because of the ends 8a and 8b of the rotor, it is possible to reduce the size of the stator, particularly of the stator casing parts 1 and 2 and minimize magnetic losses by permitting the AC magnetic field to effectively intersect the DC magnetic field of the permanent magnets.

One of the important features of the invention resides in the use of the plate 3 which greatly contributes to the improvement in the self-starting characteristics and increases the force of rotation. Depending upon the association of a simple solenoid with the cylindrical rotor, an N or S pole develops locally on the rotor. Strong and weak magnetic flux distributions appear at the circumferential surface of the rotor on both sides of the plate 3. These distributions of magnetic flux in conjunction with the electrical currents which flow through the coils 4a and 4b and which have the above phase-difference with respect to each other has a significant effect in imparting a strong rotational directivity on the rotor. When the N and S poles are developed on the opposite sides of the narrowest central part of each elongated rotor portion 8e, the plate 3 cancels the magnetism so as to prevent the development of any magnetic flux.

In accordance with the phase difference provided by way of the coils 4a and 4b, the stator magnets 9a and 9b are fixedly arranged so that a phase angle develops between the two circular rows of magnetic poles so as to improve in this way the self-starting characteristics and force of rotation as well as imparting the motor of the invention a strong rotational directivity.

By way of tests it has been found that the motor according to the present invention is improved over conventional motors in the manner illustrated in the following table:

| | Power consumption (W) | Torque (kg-cm) | Efficiency (%) | Temperature rise (°C) | Weight (g) |
| --- | --- | --- | --- | --- | --- |
| Warren-motor Model No. B-3 manufactured by TS | 4 | 0.9 | 0.23 | less than 40 | 350 |
| Induction motor Model No. A-1 manufactured by NS | 4 | 2.0 | 0.5 | 35 | 260 |
| Induction motor proposed by this invention | 0.6 | 3.0 | 5.0 | 5 (by resistance method) | 200 |

NOTE: The listed torque was measured at a speed of 1 rpm.

What is claimed is:
1. In a synchronous motor, a pair of circular permanent magnet means respectively having equal diameters and respectively surrounding a common axis while being situated adjacent each other respectively on opposite sides of a plane normal to said axis, each of said permanent magnet means having a series of N and S poles alternating with each other and circumferentially distributed about said axis and the number of N and S poles of one of said permanent magnet means equalling the number of N and S poles of the other of said permanent magnet means while being angularly offset with respect thereto to provide a predetermined out-of-phase relationship between the poles of said pair of permanent magnet means, a pair of circular coil means which have equal diameters respectively surrounding and spaced from said pair of permanent magnet means and also situated adjacent each other on opposite sides of said plane for respectively receiving alternating currents of the same frequency which have with respect to each other the same out-of-phase relationship as the poles of said pair of permanent magnet means, a circular magnetic plate situated in said plane between said pair of coil means for separating the latter from each other, said plate having an inner circumferential edge defining a circle whose center is in said axis and whose diameter is larger than the diameter of each of said permanent magnet means, said plate, said pair of coil means, and said pair of permanent magnet means all being stationary and forming part of a stator of the motor, a single rotor interacting with both permanent magnet means and both coil means, and support means supporting said rotor for rotary movement around said axis, said rotor having a cylindrical wall coaxially surrounding said axis and situated between said pair of permanent magnet means, and said pair of coil means and plate, with said cylindrical wall of said rotor having an inner surface directed toward said pair of permanent magent means and an outer surface directed toward said pair of coil means and said plate therebetween, said cylindrical wall having a plurality of axially extending elongated cutouts circumferentially distributed about said axis and separated from each other by elongated portions of said cylindrical wall which extend substantially parallel to said axis, the number of poles of each of said permanent magnet means being an even multiple of the number of said elongated portions of said cylindrical wall and the latter elongated portions of said cylindrical wall being uniformly distributed circumferentially around said axis.

2. The combination of claim 1 and wherein a separate magnetic plate is also situated in said plane between said pair of permanent magnet means separating the latter from each other.

3. The combination of claim 1 and wherein each of said elongated portions of said cylindrical wall is of a substantially hourglass configuration and has a central region of minimum width situated at said plane with each of said elongated portions of said cylindrical wall being of a gradually increasing width at each side of said plane in a direction away from said plane.

4. The combination of claim 1 and wherein said rotor has at one end of said cylindrical wall a substantially flat end wall portion situated in a second plane normal to said axis, and said stator including a casing means in which said pair of coil means are housed together with said plate which is situated therebetween, said casing means having a magnetic end wall serving as a yoke and extending parallel to while being spaced only slightly from said end wall of said rotor to define a narrow gap therewith.

5. The combination of claim 4 and wherein said rotor includes at an end thereof opposite from said flat end wall an outwardly directed annular flange situated in a third plane normal to said axis and said casing means having a second end wall parallel to and spaced slightly from said flange to define a narrow gap therewith.

6. The combination of claim 1 and wherein said rotor cooperates with said stator to have the position and direction of rotation of said rotor determined exclusively by the action of said pair of coil means and plate therebetween with said pair of permanent magnet means on said rotor.

7. The combination of claim 6 and wherein said rotor is made of a thin sheet material so that said rotor has a small weight.

8. The combination of claim 1 and wherein each pole of each permanent magnet means is situated along a line parallel to said axis and situated midway between a pair of successive poles of the other permanent magnet means.

* * * * *